Sept. 3, 1968
G. O. TURNBULL
3,399,790
ELEVATOR SPOUT GUIDE
Filed July 11, 1966
2 Sheets-Sheet 1
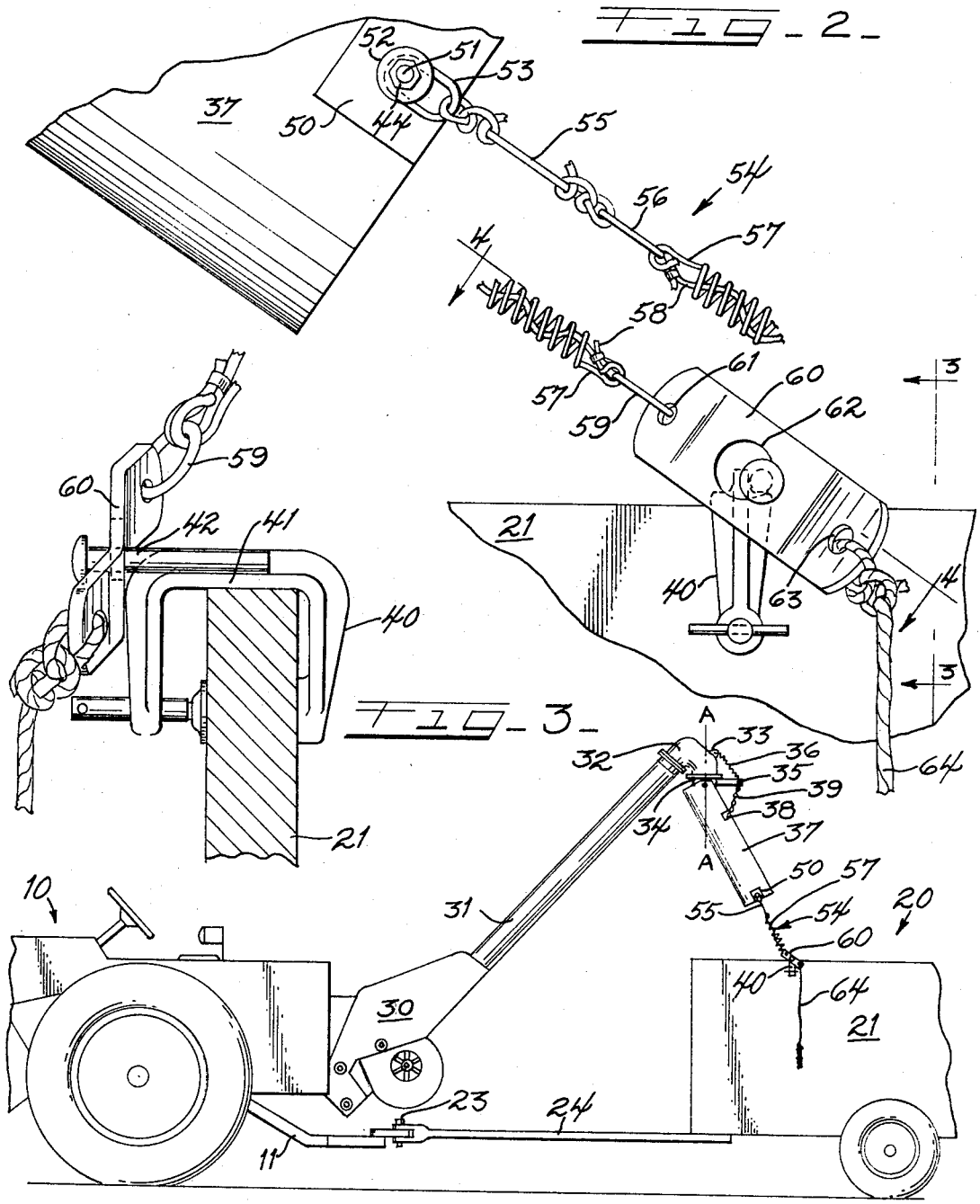
INVENTOR
GLEN O. TURNBULL
BY
ATT'Y Sept. 3, 1968 G. O. TURNBULL 3,399,790
ELEVATOR SPOUT GUIDE
Filed July 11, 1966 2 Sheets-Sheet 2
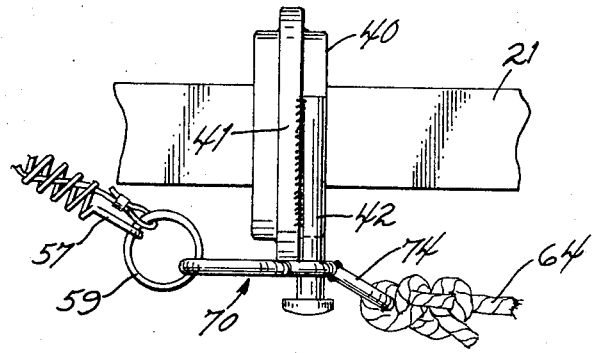
FIG_6_
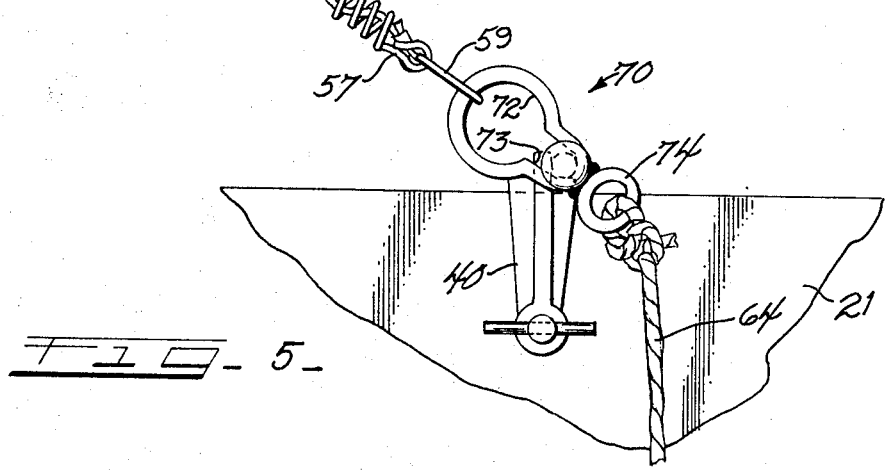
FIG_5_
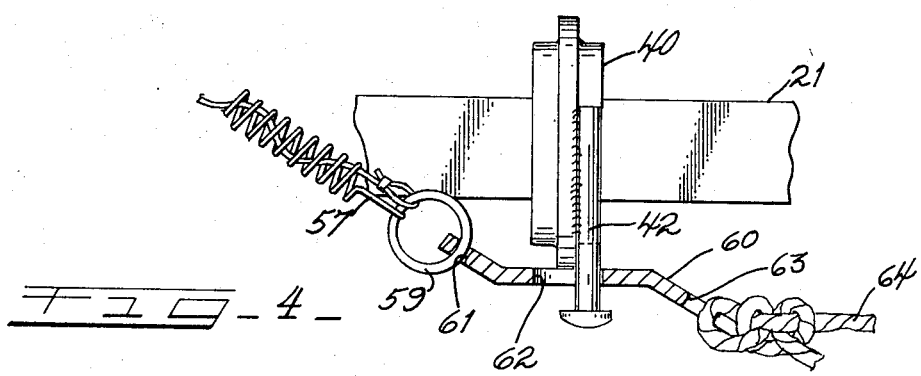
FIG_4_
INVENTOR
GLEN O. TURNBULL
BY
ATT'Y.

United States Patent Office 3,399,790
Patented Sept. 3, 1968

3,399,790
ELEVATOR SPOUT GUIDE
Glen O. Turnbull, Rock Island, Ill., assignor to International Harvester Company, Chicago, Ill., a corporation of Delaware
Filed July 11, 1966, Ser. No. 564,353
11 Claims. (Cl. 214—42)

The present invention relates generally to a guide for an auger elevator discharge chute and more particularly to a new and improved guide that is easily fastened to and released from the side walls of the trailing wagon and also incorporates a safety feature to protect the operator.

In harvesting some grains such as corn, it is the common practice to hitch a trailing wagon to the farm implement arranged to receive the corn from an elevator that extends rearwardly from the implement. The elevator is provided with a downwardly directed swiveling chute to insure that the grain is deposited in the center of the wagon. In the past, means such as springs have been connected to the sides of the wagon and to the chute to retain the discharge end of the chute in the center of the wagon regardless of the relative position of the implement and the wagon. These spring means are necessary to keep the chute properly aimed when turning for contour planted crops and at the ends of rows. A disclosure of a spring means such as this can be found in the patent to Court No. 2,377,760 of June 5, 1945.

Although a chute controlled by springs in the manner discussed above functions satisfactorily, there are several undesirable features of this device that the subject invention has overcome. The trailing wagons often have extremely high side walls and it is a difficult and time consuming task for the operator to connect and disconnect the springs to the side walls. Also when unexperienced operators connect the springs to the side walls they often do not connect them at the correct position, for example too far to the rear which causes the spout to raise and the grain fails to flow. This causes the elevator to plug and the implement must then be stopped and manually cleared. Another disadvantage found in the prior art chute guide means, is that when the operator forgets to disconnect the springs from the wagon side walls, the springs are then torn apart or the connecting means are torn from the wagon box as the tractor is driven away. The connecting means and/or the springs are then catapulted forward at considerable speed and endanger the tractor operator.

The general purpose of this invention is to provide a guide for an elevator chute which embraces all the advantages of similarly employed guides and possesses none of the aforedescribed disadvantages. To attain this, the present invention utilizes elongated guide means having frangible portions adjacent the connection with the free end of the chute. The purpose of the invention is further obtained by providing mount means that can be clamped to the sides of the wagon to which the free ends of the elongated guide means are releasably secured. The connection between the free ends of the elongated guide means and the mounts are such that the connection can be made or disconnected by the operator through the manipulation of a pull rope.

An object of the present invention is to provide guide means for the chute of an elevator that are releasably secured to mounts carried by the wagon's side walls.

Another object is to provide guide means for an elevator chute that can be releasably secured to mounts carried by the side walls of a wagon through manipulation of pull ropes.

Still another object is to provide a guide for an elevator chute including spring means that will not endanger the operator in the event the tractor is driven away from the wagon without disconnecting the guide means from the side of the wagon.

These and other objects of the invention will become more apparent from the specification and drawings wherein:

FIGURE 1 is a side view of a tractor supporting a farm implement having an elevator with an attached chute for depositing material into a trailing wagon;

FIGURE 2 is an enlarged side view of the elongated guide means having portions broken away;

FIGURE 3 is an end view of the mount means taken along lines 3—3 of FIGURE 2 and showing the wagon side wall in cross section;

FIGURE 4 is an elevation view taken along lines 4—4 of FIGURE 2 and showing one embodiment of the latch in cross section;

FIGURE 5 is a side view of another embodiment of the latch, and

FIGURE 6 is a plan view of the embodiment shown in FIGURE 5.

Referring now to the drawings wherein like reference characters designate like or corresponding parts throughout the several views, there is shown in FIGURE 1, a tractor generally designated 10 having a field traversing farm implement 30 mounted thereon and a box type trailing wagon 20 including upright side walls 21. The wagon 20 is connected to the tractor 10 by a wagon hitch pin 23 securing the wagon tongue 24 to the tractor drawbar 11. A material elevator 31 extends upwardly and rearwardly from the implement 30 along the longitudinal axis of the tractor. The material elevator 31 terminates in a discharge end having a head 32 mounted thereon. The head 32 has an ear 33 extending therefrom for a purpose to be described. The head 32 has a rotary sleeve 34 pivotally mounted thereon about its discharge opening. The rotary sleeve 34 is adapted to swivel with respect to the head 32 about a substantially vertical axis designated A—A. A lever arm or mask 35 extends rearwardly from the rotary sleeve 34. A coil spring 36 is connected at one end to the ear 33 and at the other end to the lever arm 35. The spring 36 biases the lever arm 35 into a central position lying along the longitudinal axis of the tractor. As the rotary sleeve and lever arm swivel about axis A—A, spring 36 functions to return it to its central position.

A downwardly directed discharge chute 37 having a free end is pivotally mounted on the rotary sleeve 34 about a substantially horizontal axis. Thus as the rotary sleeve 34 swivels about the head 32, it will carry with it the discharge chute 37. As disclosed herein, the discharge chute is in the form of a U-shaped trough and has lugs 38 secured along its terminal edges. A chain 39 is secured at its midpoint to the free end of lever arm 35 and is adapted to be connected at its ends to the lugs 38. The angle of the discharge chute 37 with respect to the horizontal, can be adjusted by lengthening or shortening the length of the chain between the lever arm 35 and the lugs 38.

As can be best seen in FIGURE 3, mount means 40 in the form of C-clamps are secured to the upright side walls 21 along their peripheral edges. A headed pin 42 is secured, for example, by welding to the bight portion 41 of the C-clamps. The headed pin is arranged with respect to the C-clamp such that its head is spaced away from the C-clamp. One mount means in the form of a C-clamp is secured along the upper peripheral edge of each of the wagon's upright side walls 21. The mount means can be left on the wagon when the implement is unhitched and thus the point where the guide means are connected to the wagon box will be the same when the implement is again hitched to the wagon. This prevents connecting the guide means to the wagon at the wrong location. Of course if the mount means 40 are needed on another wagon, they are easily removed and installed on the other wagon. Also, if it is found that the location of the mount means 40 on the side wall of the wagon is improper, it is a simple matter to relocate the mount means.

The free end of the downwardly directed discharge chute 37 has gusset plates 50 secured to each side forming a reinforced area through which a bolt 51 extends. (See FIGURE 2.) A link 53 is carried by the bolt 51 and is secured in place by a washer 52 and a nut 44. Although only one link 53 is shown, it should be understood that another link is provided in the same manner on the other side of the chute. An elongated guide means 54 is connected at one end to the link 53 and at the other end to the mount means 40. There is an elongated guide means extending from each side of the chute to each side wall 21 of the wagon. A safety rope 55 made from a frangible material that will break when subjected to tension in excess of a predetermined amount, is secured at one end to the link 53 and at its other end to a link 56. A coil spring 57 of a given length in the unstressed condition is secured at one end to link 56 and at the other end to a link 59. A latch 60, one embodiment of which is made of sheet material, has an opening 61 formed in the first end thereof. The link 59 extends through the opening 61 to thereby connect the coil spring 57 and safety rope 55 to the latch 60. A wire cable 58 is connected at a first end to the link 56 and at its second end to the link 59. The length of the wire cable between links 56 and 59 is greater than the length of the coil spring 57 when it is in the unstressed condition. Thus the elongated guide means 54 is permitted to expand until the coil spring 57 has reached a length equal to the length of the wire cable 58 extending from link 56 to link 59. Further tension on the elongated guide means will be absorbed by the wire cable 58 and further expansion of the elongated guide means will not be permitted. If the tension in the elongated guide means continues to increase, the safety rope 55 will eventually be broken and the guide means rendered inoperative and the connection between the downwardly directed discharge chute 37 and the upright side walls 21 of the wagon 20, will have been broken.

When the safety ropes 55 are broken, the expended coil spring 57 will whiplash in a direction away from the operator and thus the operator will not be placed in jeopardy. Furthermore, the frangible safety rope 55 can be replaced at a nominal cost as compared to the cost of replacing the coil spring 57. Thus this feature of the invention has two main advantages in that it reduces the hazard to the operator and it eliminates the possibility of tearing up the coil springs or ripping the mount means from its securement to the wagon's upright side walls. The safety rope 55 must, of course, be carefully chosen such that it has a tensile strength that will permit it to fracture before the mount means are torn from the sides of the wagon and before the wire cable 58 is fractured.

The latch 60 as seen in FIGURES 1 through 4 inclusive, has a large aperture 62 formed in its mid-portion. The size of the aperture 62 is such that the head of the headed pin 42 can easily pass through the aperture with clearance to spare. An opening 63 is formed in the latch 60 at its second end to which is secured a pull rope 64. As can be best seen in FIGURE 4, the first end of the latch in which opening 61 is formed is offset inwardly towards the center of the wagon and the second end in which opening 63 is formed is offset outwardly away from the center of the wagon. The offset of the front end of the latch is aimed towards the free end of the discharge spout and the offset of the second end of the latch serves to space this end of the latch away from the upright side walls 21 of the wagon. The pull rope 64 hangs down from the latch along the upright side walls 21 of the wagon where it can be conveniently grasped by an operator to connect or disconnect the latch 60 to the mount means 40. As best illustrated in FIGURE 2, the resiliency of the elongated guide means 54 bias the latch 60 towards the free end of the downwardly directed discharge chute and the periphery of the aperture 62 is held into engagement with the shank of the headed pin 42. The head of the headed pin prevents the latch 60 from sliding off the shank of the headed pin 42. When it is desired to disconnect the latch 60 from the mount means 40, the operator grasps the pull rope 64 and applies a tension to the elongated guide means 54 along its axis. When the headed pin 42 is located centrally of the aperture 62, the operator then pulls outwardly on the pull rope 64 and the latch 60 is thereby released from the mount means 40. The same procedure is reversed when it is desired to connect the latch means 60 to the mount means 40. The advantage of providing a pull rope through which the operator can control the latch 60 is that the upright side walls 21 of the wagon are often of a height that the latch would be out of the operator's reach. Thus the pull ropes permit the operator to control the latch without climbing up on the wagon.

Referring now to FIGURES 5 and 6, another embodiment of latch means designated 70 is disclosed. The latch means 70 is constructed of rod material formed such that a key hole shaped aperture is defined. The key hole shaped aperture includes a large opening designated 72 and a small opening designated 73. The large opening 72 is dimensioned such that the head of the headed pin 42 can pass therethrough with considerable clearance. The small opening 73 is dimensioned such that it will receive the shank of the headed pin 42 with little clearance. The link 59 of the elongated guide means 54 is connected to the latch 70 through the large opening 72. A ring 74 is secured for example, by welding to the rod material of latch 70 adjacent the small opening 73. As can be best seen in FIGURE 6, the ring 74 is offset outwardly from the plane of the major portion of latch 70. This offset functions to space the ring 74 away from the upright side wall 21 of the wagon. The pull rope 64 extends through ring 74 and the latch 70 is operated through the pull rope in the same manner as discussed above with reference to latch 60.

Various modifications are contemplated and may obviously be resorted to by those skilled in the art without departing from the spirit and scope of the invention as hereinafter defined by the appended claims as only the preferred embodiments thereof have been disclosed.

What is claimed is:
1. A field traversing farm implement having a trailing box type wagon hitched thereto;
   said trailing wagon having upright side walls,
   a material elevator extending upwardly from and along the longitudinal axis of said implement and terminating in a discharge end above said trailing wagon,
   a downwardly directed discharge chute carried by said elevator such that it receives material from said discharge end and can swing with respect thereto about a substantially vertical axis, said downwardly directed discharge chute terminating in a free end adapted to overlie said box type wagon,
   mount means secured to the upper terminal edges of said upright side walls, said mount means including headed pins projecting outwardly from said upright side walls,
   elongated guide means including springs secured at their upper ends to the free end of said downwardly directed discharge chute and at their lower ends to said mount means, latches carried by the lower ends of said mount means for releasable connection to the headed pins of said mount means, said latches having apertures formed therein of a size larger than the heads of said headed pins,
   and pull ropes secured to and hanging downwardly from said latches through which an operator can control the latches to connect and disconnect said latches to said mount means.

2. The invention as set forth in claim 1 wherein said mount means comprise a C-clamp and said headed pin is secured to the bight portion of said C-clamp.

3. The invention as set forth in claim 1 wherein said latches are constructed of a ribbon of sheet material connected at a first end to said elongated guide means and at a second end to said pull rope, and said apertures being formed in said ribbons of sheet material between said first and second ends.

4. The invention as set forth in claim 2 wherein said latches are constructed of a ribbon of sheet material connected at a first end to said elongated guide means and at a second end to said pull rope, and said apertures being formed in said ribbons of sheet material between said first and second ends.

5. The invention as set forth in claim 1 wherein said latches are constructed of rod material formed into rings defining keyhole shaped apertures, the large opening of said rings defining said apertures and the small opening of said ring being of a dimension to receive the shank of said headed pins.

6. The invention as set forth in claim 2 wherein said latches are constructed of rod material formed into rings defining keyhole shaped apertures, the large opening of said rings defining said aperture and the small opening of said rings being of a dimension to receive the shank of said headed pins.

7. A field traversing farm implement having a trailing box type wagon hitched thereto,
said trailing wagon having upright side walls,,
a material elevator extending upwardly from and along the longitudinal axis of said implement and terminating in a discharge end above said trailing wagon,
a downwardly directed discharge chute carried by said elevator such that it receives material from said discharge end and can swing with respect thereto about a substantially vertical axis, said downwardly directed discharge chute terminating in a free end adapted to overlie said box type wagon,
mount means secured to the upper terminal edges of said upright side walls,
elongated guide means secured at their upper ends to the free end of said downwardly directed discharge chute and at their lower ends to said mount means,
said elongated guide means including frangible safety ropes connected at one end to the free end of said downwardly directed discharge spout,
coil springs, of a given length when in the unstressed condition, connected at one end to the other end of said frangible safety ropes,
latch means connetced to said mount means and to the other ends of said coil springs,
and wire cables of a length in excess of said given length and secured at a first end to said other end of said frangible safety ropes and at its second end to said latch means to thereby limit the expansion of said coil springs.

8. The invention as set forth in claim 1 wherein said elongated guide means include frangible safety ropes connected at one end to the free end of said downwardly directed discharge spout,
coil springs, of a given length when in the unstressed condition, connected at one end to the other end of said frangible safety ropes and at the other ends to said latches,
and wire cables of a length in excess of said given length and secured at a first end to said other end of said frangible safety ropes and at its second ends to said latch means to thereby limit the expansion of said coil springs.

9. The invention as set forth in claim 8, wherein said mount means comprise C-clamps and said headed pins are secured to the bight portions, of said C-clamps.

10. The invention as set forth in claim 8 wherein said latches are constructed of a ribbon of sheet material connected at a first end to the elongated guide means and at a second end to said pull ropes, and said aperture being formed in said ribbons of sheet material between said first and second ends.

11. The invention as set forth in claim 8 wherein said latches are constructed of rod material formed into rings defining keyhole shaped apertures, the large opening of said rings defining said apertures and the small openings of said rings being of a dimension to receive the shank of said headed pins.

References Cited

UNITED STATES PATENTS 2,377,760   6/1945   Court.
3,339,761   9/1967   Keith _____ 214—42

ROBERT G. SHERIDAN, *Primary Examiner.*